United States Patent Office 2,725,367
Patented Nov. 29, 1955

2,725,367

SALTS OF TERPOLYMERS OF MALEIC ANHYDRIDE, DIISOBUTYLENE AND DIVINYLBENZENE

Warren D. Niederhauser, Huntingdon Valley, Pa., assignor to Rohm & Haas Company, Philadelphia, Pa., a corporation of Delaware No Drawing. Application January 29, 1953,
Serial No. 334,101

5 Claims. (Cl. 260—78.5)

This invention relates to the salts, particularly the ammonium salts, of the terpolymers of maleic anhydride, diisobutylene and divinylbenzene. It relates to the water-soluble salts which are dispersing agents and to the ammonium salts in particular which are especially valuable for the sizing of textiles, paper and leather.

According to the process of this invention the polymeric salts are prepared by copolymerizing, as essential components, diisobutylene, maleic anhydride and divinylbenzene. The copolymerization is best carried out in solution and in the presence of a free-radical catalyst. The polymeric product which contains in its molecular structure a plurality of anhydride groups is then converted to the salt form by neutralization with a base such as sodium hydroxide, potassium hydroxide, ammonium hydroxide, calcium hydroxide or a quaternary ammonium hydroxide such as trimethylbenzylammonium hydroxide.

It has been proposed heretofore, for example in United States Patent 2,378,629, to copolymerize maleic anhydride and diisobutylene. The products of this invention differ, however, from the compounds known heretofore in that they contain a third component, namely divinylbenzene. But of greater importance is the fact that the terpolymers of this invention are surprisingly superior in their utility to the older two-component polymers. This is evident, for example, when the ammonium salts of the old copolymers and the new terpolymers are used for sizing paper.

In this process maleic anhydride and diisobutylene polymerize in the ratio of 2 to 3 molecular equivalents of the former to 3 to 2 molecular equivalents of the latter.

The amount of divinylbenzene which is required to effect the improvement over the simpler copolymers of maleic anhydride and diisobutylene is surprisingly small. From about 0.3% to about 5%, based on the combined weight of the other two components is sufficient; and this amount can be present at the outset of the copolymerization reaction or can be added after the maleic anhydride and diisobutylene have been partially copolymerized. In any case, the divinylbenzene becomes an integral part of the final polymer.

The polymerization is best carried out in solution. A wide variety of solvents for the three essential components can be used including benzene, toluene, xylene, dioxane and ethylacetate. In fact a large excess of the diisobutylene can serve as a solvent for the reaction mixture, and, since it is a liquid, it can easily be separated from the polymeric product by distillation.

A free-radical catalyst is used in order to accelerate the rate of polymerization. For this purpose from about .03% to about 5% of an organic peroxide compound or an azo catalyst, typified by the following, is employed: benzoyl peroxide, acetyl peroxide, lauroyl peroxide, tert.-butyl hydroperoxide, di-tert.-butyl peroxide, tert.-butyl perbenzoate, stearoyl peroxide, ascaridole, cumene hydroperoxide, azodiisobutyronitrile and dimethyl azoisobutyrate.

Temperatures from about 60° C. to the boiling point of the reaction mixture are recommended.

The terpolymer which contains reactive anhydride groups is converted to the salt form by reaction with a basic compound. That is, the terpolymer is at least partially neutralized. The water-soluble salts of the alkali metals and particularly the salts of ammonia are currently the most useful. The salts of the heavy metals such as chromium, lead, and copper are water-insoluble and can best be formed by ion-exchange by first treating a material such as soil or leather with a solution of an alkali metal salt and then treating the material subsequently with a solution of an inorganic salt of the particular heavy metal such as chromium, zirconium, or aluminum. Not only are the salts of the terpolymers and individual metals embraced by this invention but the mixed salts of two or more metals, e. g., sodium and calcium, as well as the acid salts in which one-half or more of the anhydride groups are neutralized are likewise within the scope of this invention.

The following examples serve to illustrate how the products of this invention are prepared.

Example 1

A mixture of 402 grams of diisobutylene, 294 grams of maleic anhydride and 330 grams of benzene was placed in a three-necked flask equipped with mechanical stirrer, thermometer and reflux condenser. The mixture was stirred and heated under a blanket of carbon dioxide to the boiling point. Six grams of benzoyl peroxide was added and refluxing was continued for four hours. Two grams of benzoyl peroxide was added and the mixture was refluxed for an additional hour. Then 9 grams of a 53% solution of divinylbenzene in ethylstyrene was added and the heating at refluxing temperature was continued for an hour. The mixture was diluted with an equal weight of benzene and was added slowly to 1000 grams of boiling water. The benzene was thus removed by steam distillation and the terpolymer which precipitated in the form of white granules was separated by filtration. It was oven-dried at 88° C. A yield of 550 grams was thus obtained which represents a yield of approximately 90% of the cross-linked terpolymer. The saponification number of the product was 535 which indicates that approximately equimolar amounts of diisobutylene and maleic had copolymerized. A 35% solution of the terpolymer in dioxane had a viscosity of 23 poises at 25° C. A portion of the polymer weighing 105 grams was added to a solution of 40 grams of sodium hydroxide in 1305 grams of water. The mixture was stirred at 80° C. overnight and the result was a 10% aqueous solution of the sodium salt of the terpolymer. In a similar manner, 10% aqueous solutions of the ammonium salt and the potassium salt were prepared by dissolving 105-gram portions of the terpolymer in (a) a solution of 35 grams of ammonium hydroxide in 1260 grams of water and in (b) a solution of 56 grams of potassium hydroxide in 1449 grams of water respectively.

Example 2

A copolymer of maleic anhydride and diisobutylene (no divinylbenzene) was made by exactly the same method as is described in Example 1. The product had a saponification number of 532 and a viscosity of 13 poises when measured as a 35% solution in dioxane at 25° C. Aqueous solutions of sodium, ammonium and potassium salts of the terpolymer were likewise prepared according to the procedure described in Example 1.

Example 3

A mixture of 156.8 grams of diisobutylene, 98 grams of maleic anhydride and 110 grams of benzene was stirred and heated to boiling. Two grams of benzoyl peroxide were added and the mixture was refluxed for 3.5 hours, after which 3 grams of a 54% solution of divinylbenzene in ethylstyrene was added and the refluxing continued for another hour. The resultant terpolymer precipitated when hexane was added in an amount equal to twice the volume of the reaction mixture. The terpolymer was filtered off and dried. A yield of 91% was thus obtained of the product having a saponification number of 535. As in the first example, 10% solutions of the salts of the terpolymer were made by dissolving 52.5-gram portions of the product in one-half the quantities of the solutions of sodium, ammonium and potassium hydroxides shown in that example. Furthermore, a 10% aqueous solution of a mixture of sodium and calcium salts was prepared by dissolving a 52.5-gram portion of the terpolymer in a solution of 10 grams of sodium hydroxide and 9.25 grams of calcium hydroxide in 645 grams of water.

*Example 4*

The procedure of Example 3 was repeated with one exception, namely that the divinylbenzene was omitted. The product has a saponification number of 530 and a viscosity of 5.5 poises when measured as a 35% solution in dioxane at 25° C.

The 10% aqueous solutions of ammonium salts of the products of Examples 1 and 2 were applied to mimeograph paper so as to deposit 0.125%, 0.25%, 0.5% and 1% of the two materials, on a dry basis. The dried sheets were tested in identical manner for the rates of penetration of ink (Carter's blue-black writing ink). The following results, expressed in the average number of seconds required for penetration, show that the terpolymer of this invention has a two-to-three fold greater sizing effect than does a copolymer which contains no divinylbenzene.

| Percent Polymer | Time in Seconds for Penetration | |
|---|---|---|
| | Product of Example 1 | Product of Example 2 |
| 0.125 | 120 | 60 |
| 0.25 | 150 | 90 |
| 0.5 | 320 | 150 |
| 1.0 | 1,200 | 600 |

In another test, the ammonium salts of the products of Examples 3 and 4 were mixed with a standard starch size in amounts of 5, 10 and 15% based on the weight of the starch. The modified starch pastes were applied to mimeograph paper in an amount equal to 2.5% of the weight of the paper. The results of ink-penetration tests were as follows:

| Percent Resin in Starch | Time in Seconds for Penetration | |
|---|---|---|
| | Product of Example 3 | Product of Example 4 |
| 5 | 240 | 120 |
| 10 | 720 | 240 |
| 15 | 1,200 | 600 |

This application is a continuation-in-part of my application, Serial No. 294,717, filed June 20, 1952, now abandoned.

I claim:

1. As a new composition of matter, a salt of a terpolymer of (a) 2 to 3 molar equivalents of maleic anhydride, (b) 3 to 2 molar equivalents of diisobutylene and (c) 0.3% to 5% divinylbenzene, based on the weight of said maleic anhydride and diisobutylene.

2. As a new composition of matter, a water-soluble sodium salt of a terpolymer of (a) 2 to 3 molar equivalents of maleic anhydride, (b) 3 to 2 molar equivalents of diisobutylene and (c) 0.3% to 5% divinylbenzene, based on the weight of said maleic anhydride and diisobutylene.

3. As a new composition of matter, a water-soluble potassium salt of a terpolymer of (a) 2 to 3 molar equivalents of maleic anhydride, (b) 3 to 2 molar equivalents of diisobutylene and (c) 0.3% to 5% divinylbenzene, based on the weight of said maleic anhydride and diisobutylene.

4. As a new composition of matter, a water-soluble ammonium salt of a terpolymer of (a) 2 to 3 molar equivalents of maleic anhydride, (b) 3 to 2 molar equivalents of diisobutylene and (c) 0.3% to 5% divinylbenzene, based on the weight of said maleic anhydride and diisobutylene.

5. As a new composition of matter, a water-soluble salt of a terpolymer of (a) 2 to 3 molar equivalents of maleic anhydride, (b) 3 to 2 molar equivalents of diisobutylene, and (c) 0.3% to 5% divinylbenzene, based on the weight of said maleic anhydride and diisobutylene.

References Cited in the file of this patent

UNITED STATES PATENTS

| 2,340,110 | D'Alelio | Jan. 25, 1944 |
| 2,378,629 | Hanford | June 19, 1945 |
| 2,409,861 | Hunter et al. | Oct. 22, 1946 |
| 2,533,635 | Seymour | Dec. 12, 1950 |
| 2,621,169 | Robinette et al. | Dec. 9, 1952 |